(12) United States Patent
Li et al.

(10) Patent No.: US 12,189,601 B2
(45) Date of Patent: Jan. 7, 2025

(54) DATA COMPRESSION METHOD, DATA DECOMPRESSION METHOD, AND ELECTRONIC DEVICE

(71) Applicant: Shenzhen Corerain Technologies Co., Ltd., Shenzhen (CN)

(72) Inventors: Yuanchao Li, Shenzhen (CN); Kuen Hung Tsoi, Shenzhen (CN); Xinyu Niu, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/362,181

(22) Filed: Jul. 31, 2023

(65) Prior Publication Data

US 2024/0184763 A1    Jun. 6, 2024

(30) Foreign Application Priority Data

Dec. 1, 2022  (CN) .......................... 202211533923.4

(51) Int. Cl.
*G06F 16/22* (2019.01)

(52) U.S. Cl.
CPC ................................ *G06F 16/2282* (2019.01)

(58) Field of Classification Search
CPC .................................................. G06F 16/2282
See application file for complete search history.

(56) References Cited

U.S. PATENT DOCUMENTS

| 5,396,595 | A | 3/1995 | Standley | |
| 11,537,853 | B1* | 12/2022 | Afzal | ..................... G10L 15/14 |
| 2013/0013606 | A1* | 1/2013 | Stanfill | ................. G06F 16/213 |
| | | | | 707/E17.002 |
| 2018/0341722 | A1* | 11/2018 | Satpathy | ............. G06F 16/9017 |
| 2021/0064986 | A1* | 3/2021 | Xi | .......................... G06N 3/084 |

(Continued)

FOREIGN PATENT DOCUMENTS

| CN | 1671103 B | * | 6/2010 | ............. H03M 7/30 |
| CN | 113595557 A | | 11/2021 | |
| CN | 114341882 A | * | 4/2022 | ............. G06F 7/483 |

OTHER PUBLICATIONS

Office Action issued on Nov. 13, 2024, in corresponding Chinese Application No. 202211533923.4, 6 pages.

(Continued)

*Primary Examiner* — Tarek Chbouki

(74) *Attorney, Agent, or Firm* — Maier & Maier, PLLC

(57) ABSTRACT

A data compression, decompression method, and an electronic device. The method includes the following steps: establishing an initial lookup table by using data with the same value in dataset to be compressed as one index, sequentially building a new Huffman tree corresponding to each index, and then adding a separator to obtain an encoding list containing a target encoding value and length, adding the encoding list to the initial lookup table to obtain a target lookup table. According to a separator of bitstream data, and searching the target lookup table in parallel, and use the indexes to obtain the decompression result of the data to be decompressed. Embodiments can perform a parallel decompression operation to increase a decompression speed, so that the decompression speed can meet the requirement of an AI engine for a large amount of weight data bandwidth in real time.

10 Claims, 3 Drawing Sheets

(56) References Cited

U.S. PATENT DOCUMENTS

2023/0078235 A1* 3/2023 Cismas .................... G06T 9/00
 382/245
2023/0153287 A1* 5/2023 Stephens ............... G06F 3/0608
 707/737

OTHER PUBLICATIONS

Search Report issued on Nov. 8, 2024, in corresponding Chinese Application No. 202211533923.4, 4 pages.

* cited by examiner

DATA COMPRESSION METHOD, DATA DECOMPRESSION METHOD, AND ELECTRONIC DEVICE

TECHNICAL FIELD

This application relates to the technical field of data processing, and in particular, to a data compression method, a data decompression method, and an electronic device.

BACKGROUND

At present, with the rapid development of deep learning, convolutional neural networks require a large storage bandwidth. To improve the bandwidth utilization rate in the prior art, a Huffman compression algorithm is usually used to compress data. Although the Huffman compression algorithm may increase the bandwidth utilization rate to some extent, the decompression speed is slow and cannot meet the requirement of an AI engine for reading and writing a large amount of data in real time. This is because that during decompression of data compressed using the Huffman algorithm, the value of one bit needs to be decompressed based on the value of a bit previous to the one bit, and the decompression process is serialized processing.

SUMMARY

Therefore, this application provides a data compression method, a data decompression method, and an electronic device, to solve the technical problem that a compression method adopted in the prior art cannot meet the requirement of an AI engine for reading and writing a large amount of data in real time.

In a first aspect, this application provides a data compression method, including:
 establishing an initial lookup table by using data with a same numerical value in data to be compressed as one index and according to a number of indexes;
 sequentially performing an encoding operation on the numerical value corresponding to each of the indexes to obtain an encoding result, and adding a separator to the encoding result to obtain an encoding list containing a target encoding value corresponding to each of the indexes and a target encoding length corresponding to each of the indexes; and
 adding the encoding list to the initial lookup table to obtain a target lookup table for compression of the data to be compressed after compression.

In a second aspect, this application provides a data decompression method, including:
 reading data to be decompressed, and evenly dividing the data to be decompressed into at least two segments of bitstream data;
 obtaining indexes contained in each segment of bitstream data and location information of each segment of bitstream data according to a separator of each segment of bitstream data; and
 searching in the target lookup table obtained in the data compression method according to the first aspect in parallel according to the indexes and the location information to obtain the decompression result of the data to be decompressed.

In a third aspect, this application provides an electronic device. The electronic device includes a processor, a communication interface, a memory, and a communication bus. The processor, the communication interface, and the memory communicate with each other through the communication bus.

The memory is configured to store a computer program.

The processor is configured to implement the data compression method according to any one of embodiments of the first aspect by executing the program stored in the memory.

In a fourth aspect, this application provides an electronic device. The electronic device includes a processor, a communication interface, a memory, and a communication bus. The processor, the communication interface, and the memory communicate with each other through communication bus.

The memory is configured to store a computer program.

The processor is configured to implement the data decompression method according to any one of embodiments of the second aspect by executing the program stored in the memory.

Compared with the prior art, the technical solutions provided by this application have the following advantages:

The initial lookup table is established according to the number of the indexes, the encoding operation is sequentially performed on the numerical value corresponding to each index and then the separator is added to obtain the encoding list, the target lookup table can be quickly established, the compression rate of the target lookup table after encoding is 80%, and thus, the bandwidth occupation is effectively reduced by 20%. As the separator is added to the encoding result obtained by the encoding operation, when the encoding result is decompressed by looking up the table, each index can be distinguished by means of the separator, so that the decompression operation can be processed in parallel, which alleviates the situation that the value of one bit needs to be decompressed based on the value of a bit previous to the one bit, and thus, the decompression speed is increased and can meet the requirement of an AI engine for reading and writing a large amount of data in real time.

BRIEF DESCRIPTION OF THE DRAWINGS

Accompanying drawings herein are incorporated into the specification and constitute a part of this specification, show embodiments that conform to this application, and are used for describing a principle of this application together with this specification.

To describe the technical solutions in the embodiments of this application or the prior art more clearly, the accompanying drawings required for describing the embodiments or the prior art are briefly described below. Apparently, an ordinary person skilled in the art may still derive other drawings from these accompanying drawings without creative efforts.

The objective implementation, functional features and advantages of this application are further illustrated with reference to the accompanying drawings by using the embodiments.

DETAILED DESCRIPTION

To make the objectives, technical solutions, and advantages of this application clearer, this application is further described below in detail with reference to the accompanying drawings and the embodiments. It is to be understood that the specific embodiments described herein are merely used to explain this application but are not intended to limit this application. All other embodiments obtained by an ordinary person skilled in the art based on the embodiments of this application without creative efforts shall fall within the protection scope of this application.

It is to be noted that the terms "first", "second" and the like in this application are merely intended for a purpose of description, and shall not be understood as an indication or implication of relative importance or implicit indication of a number of indicated technical features. Therefore, a feature restricted by "first" or "second" may explicitly indicate or implicitly include at least one of such features. In addition, the technical solutions of the embodiments may be combined with each other, provided that the combination of the technical solutions can be implemented by an ordinary person skilled in the art. When the combined technical solutions conflict with each other or cannot be implemented, it is to be considered that such a combination of the technical solutions does not exist or is not within the protection scope of this application.

Figure 1:
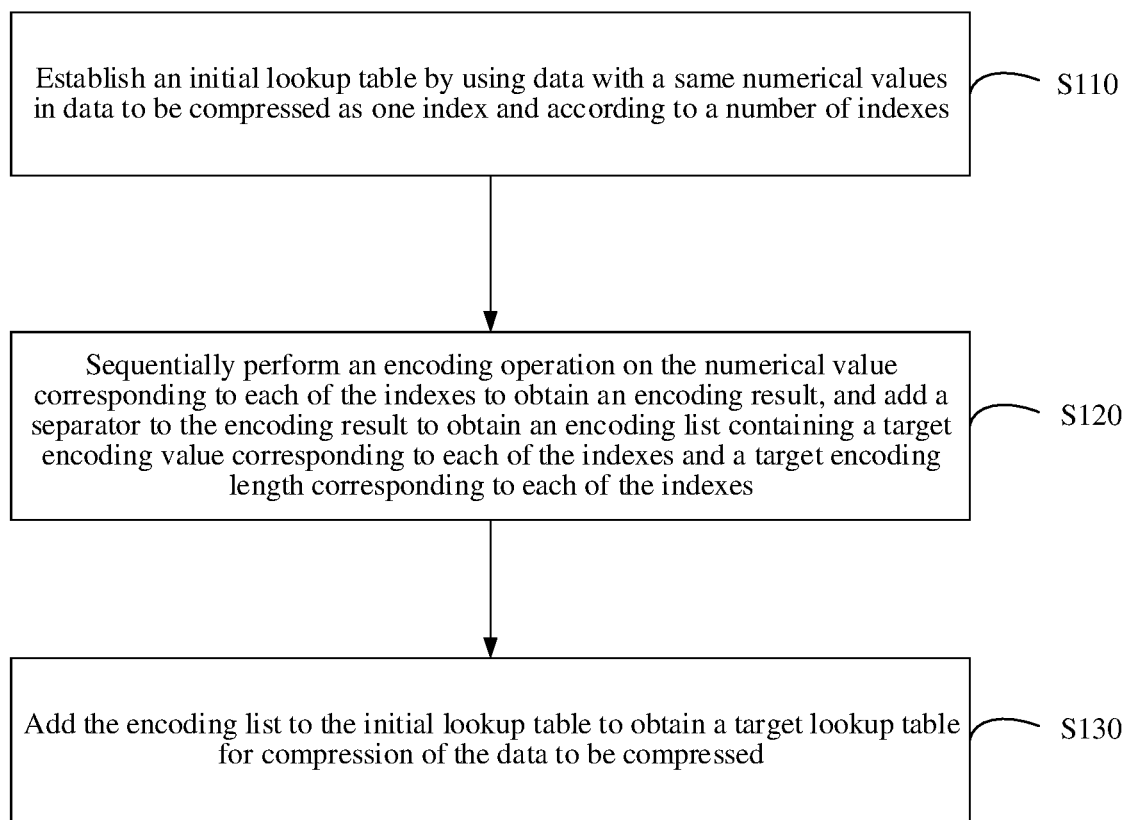
FIG. 1 is a schematic flowchart of a preferred embodiment of a data compression method according to this application.

This application provides a data compression method. Refer to FIG. 1, which is a schematic method flowchart of an embodiment of a data compression method according to this application. The method may be executed by an electronic device. The electronic device may be implemented by software and/or hardware. The data compression method includes:

S110: establishing an initial lookup table by using data with a same numerical value in data to be compressed as one index and according to a number of indexes;

S120: sequentially performing an encoding operation on the numerical value corresponding to each of the indexes to obtain an encoding result, and adding a separator to the encoding result to obtain an encoding list containing a target encoding value corresponding to each of the indexes and a target encoding length corresponding to each of the indexes; and S130: adding the encoding list to the initial lookup table to obtain a target lookup table for compression of the data to be compressed.

In this embodiment, the solution is illustrated by using the data to be compressed as a weight parameter of convolutional neural network as an example. In practical application scenes, due to a large amount of computation, the inference operation time of the convolutional neural network is relatively long, and therefore, it is necessary to encode (compress) the weight parameter of a model first and then decode (decompress) the weight parameter, so as to increase the bandwidth utilization rate and reduce the inference operation time of the model. It is understood that the data to be compressed may be the weight parameter of an artificial intelligence model, or other data that need to be compressed first and then decoded to improve the operating efficiency of a system, for example, the weight parameters of recognition models in the fields of text recognition, voice recognition, and the like, and may also be video data or audio data, and the like, which are not limited here.

The data to be compressed is classified and counted, and the data with a same numerical value in the data to be compressed is used as one index. For example, in the data to be compressed, the numerical value 174 has appeared 248 times, the numerical value 176 has appeared 234 times, and the numerical value 175 has appeared 232 times, then 248 numerical values 174 is used as one index, 234 numerical values 176 is used as one index, and 232 numerical values 175 is used as one index. The initial lookup table is established according to the number of indexes, and further, the initial lookup table may also include the numerical values corresponding to the indexes and the frequency of appearance of numerical values. Specifically, the establishing an initial lookup table by using data with a same numerical value in data to be compressed as one index and according to a number of indexes includes:

collecting statistics on the data with the same numerical value in the data to be compressed, and using the data with the same numerical value as one index; and calculating a frequency of appearance of each of the same numerical values, and establishing the initial lookup table according to the same numerical values, the number of indexes, and the frequency of appearance of the same numerical values.

The frequency of appearance of the same numerical values in the data to be compressed is calculated; the initial lookup table is established according to the numerical value, the number of indexes, and the frequency of appearance of the same numerical values; and the initial lookup table may be sorted sequentially according to a serial number of the indexes. For example, the initial lookup table may be obtained by classifying and collecting statistics on the weight parameters of one layer, resnet_v1_50_conv1_weights.npy in one layer, of Resetnet50 network:

seq: 0 data: 174 freq: 248
seq: 1 data: 176 freq: 234
seq: 2 data: 175 freq: 232
seq: 3 data: 178 freq: 213
seq: 4 data: 177 freq: 210
seq: 5 data: 173 freq: 201
. . .
seq: 143 data: 243 freq: 1
seq: 144 data: 7 freq: 1
seq: 145 data: 246 freq: 1
seq: 146 data: 0 freq: 1 where seq represents the serial number of the index, data represents the numerical value, and freq represents the number of appearance of the numerical value. With the gradual increase of the index, after statistics on all the numerical values in the data to be compressed are collected, a maximum serial number index_num of the index can be obtained, and a maximum serial number of the index in the above initial lookup table is 147.

After the initial lookup table is obtained, the numerical value corresponding to each index are sequentially encoded according to the serial number of the index to obtain an encoding result, and separator information (2'b11) is added to a tail of the encoding result to obtain an encoding list. The encoding list contains a target encoding value corresponding to each index and a target encoding length corresponding to each index. As the separator is added to the encoding result obtained by the encoding operation, when the encoding result is decompressed subsequently by looking up the table, each index may be distinguished by means of the separator, so that the decompression operation may be processed in parallel, which alleviates the situation that the value of one bit needs to be decompressed based on the value of a bit previous to the one bit, and thus, the decompression speed is increased. The encoding list corresponding to the initial lookup table is as follows:

encode: 011 len: 3
encode: 0011 len: 4
encode: 0111 len: 4
encode: 00011 len: 5
encode: 01011 len: 5
encode: 00111 len: 5
. . .
encode: 010000000011 len: 12
encode: 001000000011 len: 12
encode: 000100000011 len: 12
encode: 010100000011 len: 12 where encode represents the target encoding value corresponding to the index, and len represents the target encoding length corresponding to the index.

After the encoding list is obtained, the encoding list is added to the initial lookup table to obtain the target lookup table for compression of the data to be compressed, and the obtained target lookup table is as follows:

seq: 0 data: 174 freq: 248 encode: 011 len: 3
seq: 1 data: 176 freq: 234 encode: 0011 len: 4
seq: 2 data: 175 freq: 232 encode: 0111 len: 4
seq: 3 data: 178 freq: 213 encode: 00011 len: 5
seq: 4 data: 177 freq: 210 encode: 01011 len: 5
seq: 5 data: 173 freq: 201 encode: 00111 len: 5
. . .
seq: 143 data: 243 freq: 1 encode: 010000000011 len: 12
seq: 144 data: 7 freq: 1 encode: 001000000011 len: 12
seq: 145 data: 246 freq: 1 encode: 000100000011 len: 12
seq: 146 data: 0 freq: 1 encode: 010100000011 len: 12

The quantized weight parameter is data with normal distribution. The compression rate of the target lookup table after encoding is 80% by using the above compression method through statistical simulation, so that the bandwidth occupation can be effectively reduced by 20% in different network environments.

Figure 2:
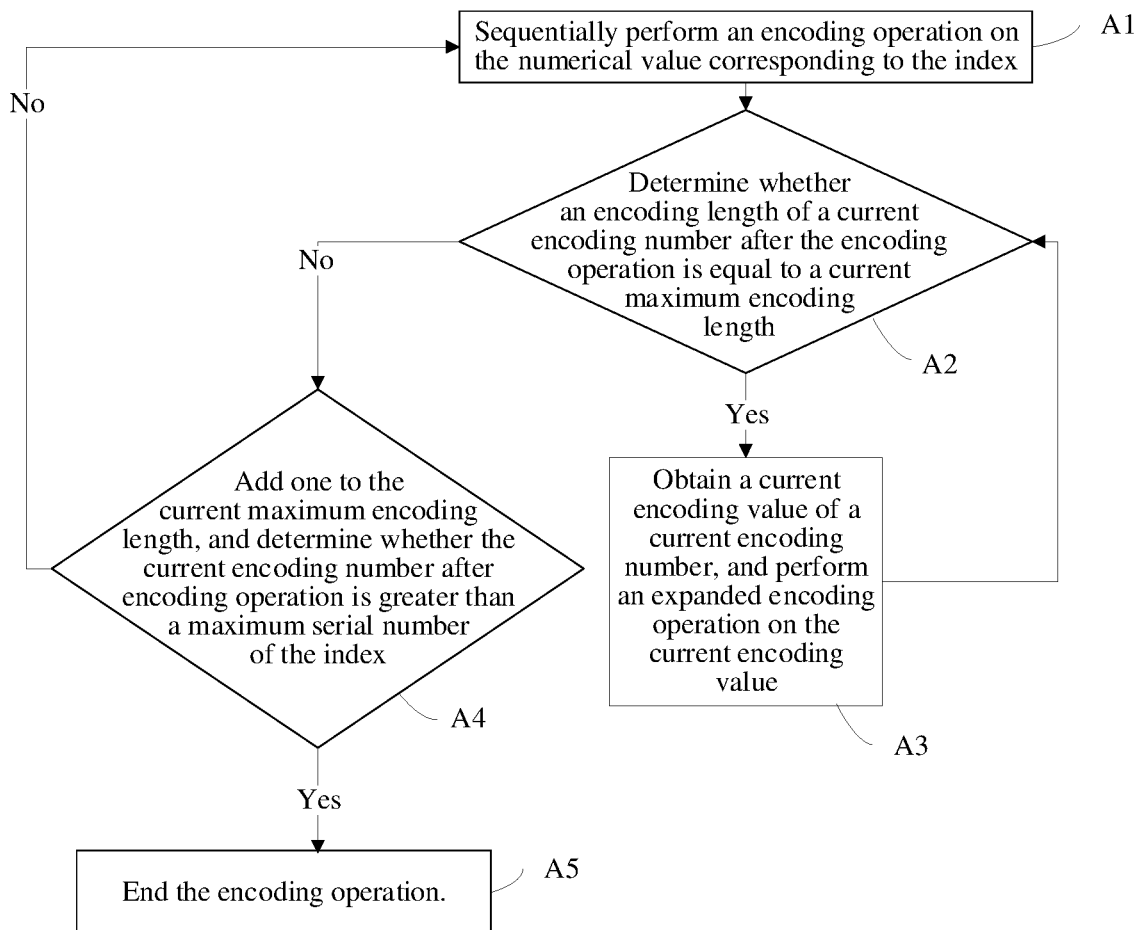
FIG. 2 is a schematic flowchart of a method for performing an encoding operation according to this application.

Refer to FIG. 2, which is a schematic flowchart of a method for performing an encoding operation according to this application. Specifically, the sequentially performing an encoding operation on the numerical value corresponding to each index includes:

step A1: sequentially performing an encoding operation on the numerical value corresponding to the index;
step A2: determining whether an encoding length of a current encoding number after the encoding operation is equal to a current maximum encoding length; if yes, performing step A3; if not, performing step A4;
step A3: obtaining a current encoding value of the current encoding number and performing an expanded encoding operation on the current encoding value, and performing step A2;
step A4: adding one to the current maximum encoding length, determining whether the current encoding number after the encoding operation is greater than a maximum serial number of the index; if yes, performing step A5; if not, performing step A1; and
step A5: ending the encoding operation.

After the encoding operation is performed on the numerical value corresponding to the index, it is determined whether an encoding length of a current encoding number encode_cnt after the encoding operation is equal to a current maximum encoding length max(len). If the encoding length of encode_cnt is equal to max(len), the current encoding value of the current encoding number is obtained, and the expanded encoding operation is performed on the current encoding value. The expanded encoding operation refers to filling a character at a tail of the encoding value. As the expanded encoding operation is encoding with a lowest encoding length, the consumption of transmission bandwidth can be reduced.

For example, a numerical value, after the encoding operation, which index is 2, the encoding bit length of encode_cnt is 4, and if (the current maximum encoding bit length) max(len)=4, that is, the encoding length of encode_cnt is equal to max(len). At this time, a current encoding value 01 of the current encoding number is obtained, and the expanded encoding operation is performed on the current encoding value 01 to obtain an encoding value 000. And the next, the current encoding number encode_cnt is 4, and the encoding length of encode_cnt is 5. As the encoding length of encode_cnt is not equal to max(len)4 at this time, the current maximum encoding length is added by 1, and it is determined whether the current encoding number after the encoding operation is greater than the maximum number of the index (that is, it is determined whether the encoding operation has been completed for the numerical values corresponding to all the indexes); if yes, the encoding operation is ended; and if not, the encoding operation is continued to be performed on the numerical values corresponding to the indexes. To be sure, if the encoding value corresponding to the serial number 2 of the index is 2'b01, the target encoding value is 0111 with a separator 2'b11.

Further, the obtaining a current encoding value of the current encoding number and performing an expanded encoding operation on the current encoding value includes:

respectively filling a first character and a second character at a tail of the current encoding value to obtain an encoding value filled with the first character and an encoding value filled with the second character;
storing the encoding value filled with the first character into the encoding list;
determining whether the separator exists in the encoding value filled with the second character;
if yes, deleting the encoding value filled with the second character; and
if not, storing the encoding value filled with the second character into the encoding list.

The first character may be 0, and the second character may be 1. The first character and the second character are respectively filled at the tail of the current encoding value to obtain the encoding value filled with the first character and the encoding value filled with the second character. As the encoding value obtained by the encoding operation cannot have a separator (2'b11), otherwise the encoding does not meet the encoding requirements (that is, the encoding value cannot have two consecutive separators), and therefore, the encoding value filled with the first character 0 is directly stored in the encoding list. For the encoding value filled with the second character 1, it is necessary to determine whether a separator exists; if yes, it is necessary to delete the encoding value filled with the second character; and if not, the encoding value filled with the second character is also stored in the encoding list.

In one embodiment, the above data compression method further includes: after the target lookup table is obtained, soring the target lookup table in a memory (for example, a double data rate synchronous dynamic random access memory (DDRSDRAM)), so that when a corresponding decompression module performs data decompression, the target lookup table is read from the DDRSDRAM for decompression, thus meeting the requirement of an AI engine for reading and writing a large amount of data in real time.

Figure 3:
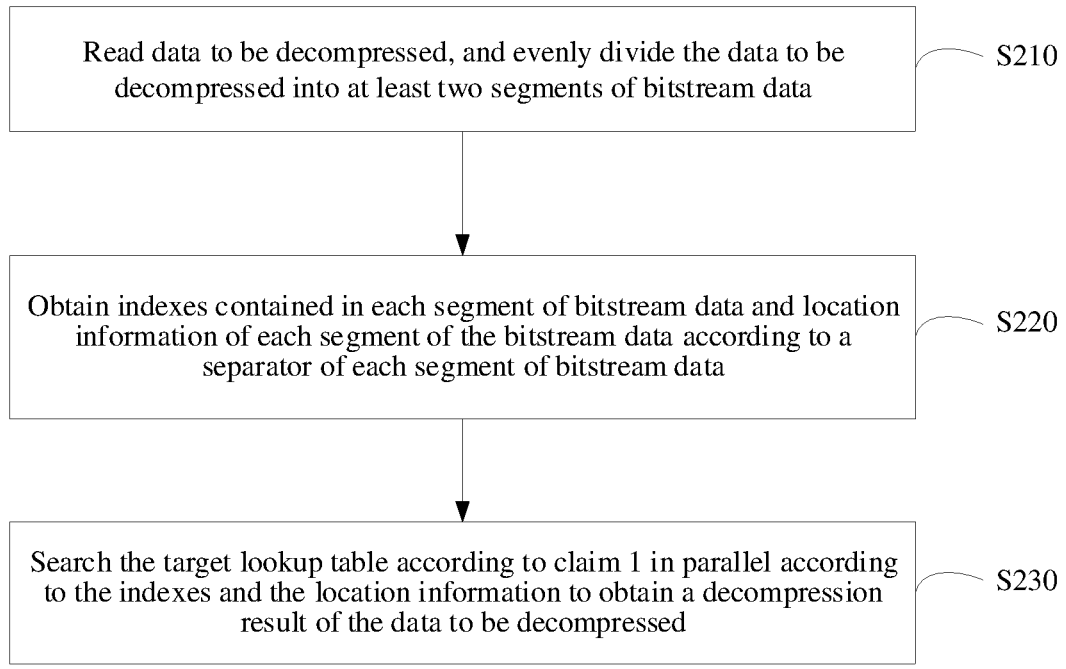
FIG. 3 is a schematic flowchart of a preferred embodiment of a data decompression method according to this application.

Refer to FIG. 3, which is a schematic method flowchart of an embodiment of a data decompression method according to this application. The method may be executed by an electronic device. The electronic device may be implemented by software and/or hardware. The data decompression method is a method for decompressing data after adopting the data compression method above. The data decompression method includes:

S210: reading data to be decompressed, and evenly dividing the data to be decompressed into at least two segments of bitstream data;

S220: obtaining indexes contained in each segment of bitstream data and location information of each segment of bitstream data according to a separator of each segment of bitstream data; and S230: searching the target lookup table in parallel according to the indexes and the location information to obtain the decompression result of the data to be decompressed.

The data to be decompressed is read. The compressed bitstream is filled to a multiple of 32 bits. If the parallelism is 64 channels, the data to be decompressed may be evenly divided into 64 segments of compressed bitstream data according to a statistical bit width of 32 bits. According to the separators contained in each segment of bitstream data, statistics on indexes contained in each segment of bitstream data and the location information of each segment of bitstream data are collected and obtained, and the decompression results of the 64 segments of compressed bitstream data in the target lookup table are searched in parallel according to the indexes and location information, so as to obtain the decompression results of the data to be decompressed.

Specifically, the searching the target lookup table in parallel according to the indexes and the location information to obtain the decompression result of the data to be decompressed includes:

sequentially searching the target lookup table according to the indexes and the location information to obtain a decompression value corresponding to each index in each segment of bitstream data; and using the decompression value corresponding to each index in each segment of bitstream data as the decompression result of the data to be decompressed.

As the location information of the bitstream data is determined by the encoding length after the encoding operation, the indexes contained in the bitstream data may be determined according to the location information, each segment of bitstream data has at least one index, and then the decompression values of all indexes in the bitstream data may be obtained by searching the target lookup table according to the indexes. For example, after the target lookup table is searched according to the index, it is determined whether the index is the last one index number of the bitstream data, and if yes, it means that the compressed data of the bitstream data has been processed. If the index is not the last index of the bitstream data, it means that the compressed data of the bitstream data has not been processed completely. At this time, the target lookup table is continued to be searched according to a next index for decompression. Then the decompression values of all indexes of all bitstream data are obtained as the decompression results of the data to be decompressed.

In one embodiment, if all bitstream data of this round of data to be decompressed are decompressed, a next round of data to be decompressed corresponding to this round of data to be decompressed may be decoded (decompressed).

The data decompression method after adopting the above data compression method can make hardware perform parallel accelerated decoding, and the decoding speed can meet the requirement of an AI engine for reading and writing a large amount of data in real time.

Figure 4:
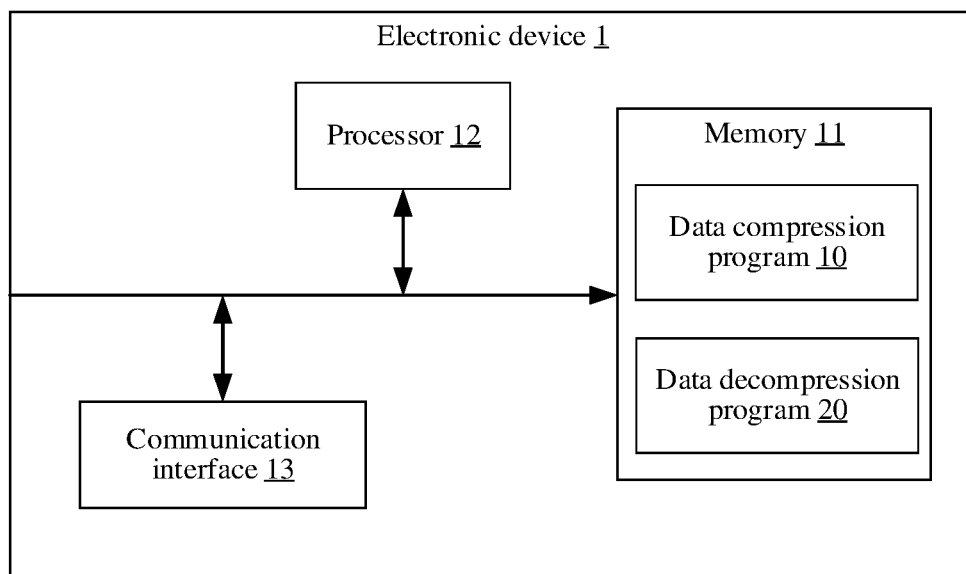
FIG. 4 is a schematic structural diagram of an electronic device for executing a data compression method and/or a data decompression method according to this application.

Referring to FIG. 4, this application also provides an electronic device 1 for executing the above data compression method and/or the above data decompression method. It is to be noted that the electronic devices executing the data compression method and/or the data decompression method may be a same electronic device or different electronic devices.

The electronic device 1 includes but is not limited: a memory 11, a processor 12, and a communication interface 13. The electronic device 1 may be connected to a network through the communication interface 13. The network may be wireless or wired networks such as internet, global system for mobile communications (GSM), 4G network, 5G network, Bluetooth, Wi-Fi, and voice network.

The memory 11 at least includes one type of readable storage medium. The readable storage medium includes a flash memory, a hard disk, a multimedia card, a card type memory (such as SD or DX memory), a random access memory (RAM), a read only memory (ROM), an electrically erasable programmable read only memory (EEPROM), a programmable read only memory (PROM), a magnetic memory, a magnetic disk, an optical disc, and the like. In some embodiments, the memory 11 may be an internal storage unit of the electronic device 1, such as a hard disk or an internal storage of the electronic device 1. The memory 11 is usually configured to store an operating system and various application software installed in the electronic device 1, such as program codes of a data compression program 10 and/or a data decompression program 20. The memory 11 may also store data to be compressed, data to be decompressed and decompression results of the data to be decompressed.

In some embodiments, the processor 12 may be a central processing unit (CPU), a controller, a microcontroller, a microprocessor, or other data processing chips. The processor 12 is usually configured to control a general operation of the electronic device 1, such as perform data interaction or communication-related control and processing. The processor 12 is configured to run program codes stored in the memory 11 or process data, for example, run the program codes of the data compression program 10 and/or the data decompression program 20.

The communication interface 13 may optionally include a standard wired interface and a wireless interface (e.g., a WI-FI interface). The communication interface 13 is usually configured to establish a communication connection between the electronic device 1 and other electronic devices.

FIG. 4 only shows the electronic device 1 with the components 11-13, but it is to be understood that it is not required to implement all the components shown, and more or less components may alternatively be implemented. For example, the electronic device 1 may further include a tensor processing unit (TPU), a decoder, and the like.

When the processor 12 executes the data compression program 10 stored in the memory 11, the following steps may be realized:

establishing an initial lookup table by using data with a same numerical value in data to be compressed as one index and according to a number of indexes;

sequentially performing an encoding operation on the numerical value corresponding to each of the indexes to obtain an encoding result, and adding a separator to the encoding result to obtain an encoding list containing a target encoding value corresponding to each of the indexes and a target encoding length corresponding to each of the indexes; and adding the encoding list to the initial lookup table to obtain a target lookup table for compression of the data to be compressed.

For a detailed description of the above steps, refer to the description of the flow chart of the data compression method embodiment in FIG. 1.

When the processor 12 executes the data decompression program 20 stored in the memory 11, the following steps may be realized:

reading data to be decompressed, and evenly dividing the data to be decompressed into at least two segments of bitstream data;

obtaining indexes contained in each segment of bitstream data and location information of each segment of bitstream data according to a separator of each segment of bitstream data; and searching the target lookup table in parallel according to the indexes and the location information to obtain the decompression result of the data to be decompressed.

For a detailed description of the above steps, refer to the description of the flow chart of the data decompression method embodiment in FIG. 3.

Furthermore, an embodiment of this application also provides a computer-readable storage medium. The computer-readable storage medium may be non-volatile or volatile. The computer-readable storage medium may be any one of or a combination of several of a hard disk, a multimedia card, an SD card, a flash card, an SMC, a read-only memory (ROM), an erasable programmable read-only memory (EPROM), a compact disk read-only memory (CD-ROM), and a USB memory. The computer-readable storage medium includes a storage data area and a storage program area. The storage program area stores the data compression program 10 and/or the data decompression program 20, and when the data compression program 10 is executed by the processor, the following operations are realized:

establishing an initial lookup table by using data with a same numerical value in data to be compressed as one index and according to a number of indexes;

sequentially performing an encoding operation on the numerical value corresponding to each of the indexes to obtain an encoding result, and adding a separator to the encoding result to obtain an encoding list containing a target encoding value corresponding to each of the indexes and a target encoding length corresponding to each of the indexes; and adding the encoding list to the initial lookup table to obtain a target lookup table for compression of the data to be compressed.

A specific implementation of the computer-readable storage medium of this application is substantially the same as the specific implementation of the previously described data compression method, so that the details are omitted here.

When the data decompression program 20 is executed by the processor, the following operations are also realized:

reading data to be decompressed, and evenly dividing the data to be decompressed into at least two segments of bitstream data;

obtaining indexes contained in each segment of bitstream data and location information of each segment of bitstream data according to a separator of each segment of bitstream data; and searching the target lookup table in parallel according to the indexes and the location information to obtain the decompression result of the data to be decompressed.

A specific implementation of the computer-readable storage medium of this application is substantially the same as the specific implementation of the previously described data decompression method, so that the details are omitted here.

It is to be noted that the sequence numbers of the foregoing embodiments of this application are merely for description purpose but do not imply the preference among the embodiments. Moreover, the terms "include," "comprise," and any variation thereof are intended to cover a non-exclusive inclusion. Therefore, in the context of a process, a device, an object, or a method that includes a series of elements, the process, device, object, or method not only includes such elements, but also includes other elements not specified expressly, or may include elements inherent to the process, device, object, or method. If no more limitations are made, an element limited by "include a/an . . . " does not exclude other same elements existing in the process, the device, the article, or the method which includes the element.

According to the descriptions in the foregoing implementations, a person skilled in the art may clearly learn that the method according to the foregoing embodiment may be implemented by relying on software and a general-purpose hardware platform or by using hardware, but in many cases, the former is the better implementation. Based on such an understanding, the technical solutions of this application essentially, or the part contributing to the prior art, may be presented in the form of a software product. The computer software product is stored in a storage medium (for example, a ROM/RAM, a magnetic disk, or an optical disc) as described above and includes several instructions to enable a terminal device (which may be a mobile phone, a computer, an electronic device, a network device, or the like) to perform the methods described in the embodiments of this application.

The foregoing descriptions are merely preferred embodiments of this application but are not intended to limit the patent scope of this application. Any equivalent modifications made to the structures or processes based on the content of the specification and the accompanying drawings of this application for direct or indirect use in other relevant technical fields shall also be encompassed in the patent protection scope of this application.

What is claimed is:

1. A data compression method, comprising:
    establishing an initial lookup table by using data with a same numerical value in data to be compressed as one index and according to a number of indexes;
    sequentially performing an encoding operation on the numerical value corresponding to each of the indexes to obtain an encoding result, and adding a separator to the encoding result to obtain an encoding list containing a target encoding value corresponding to each of the indexes and a target encoding length corresponding to each of the indexes; and
    adding the encoding list to the initial lookup table to obtain a target lookup table for the data to be compressed after compression;

wherein the establishing the initial lookup table by using the data with the same numerical value in the data to be compressed as one index and according to the number of indexes comprises:
collecting the data with the same numerical value in the data to be compressed, and using the data with the same numerical value as one index; and
counting a number of appearances of each of the same numerical values, and establishing the initial lookup table according to the same numerical values, the number of indexes, and the numbers of appearances of the same numerical values.

2. The data compression method according to claim 1, wherein sequentially performing the encoding operation on the numerical value corresponding to each of the indexes comprises:
step A1: sequentially performing an encoding operation on the numerical value corresponding to the index;
step A2: determining whether an encoding length of a current encoding number after the encoding operation is equal to a current maximum encoding length; if yes, performing step A3; if not, performing step A4;
step A3: obtaining a current encoding value of the current encoding number and performing an expanded encoding operation on the current encoding value, and performing step A2;
step A4: adding one to the current maximum encoding length, determining whether the current encoding number after the encoding operation is greater than a maximum serial number of the index; if yes, performing step A5; if not, performing step A1; and
step A5: ending the encoding operation.

3. The data compression method according to claim 2, wherein obtaining the current encoding value of the current encoding number and performing the expanded encoding operation on the current encoding value comprises:
respectively filling a first character and a second character at a tail of the current encoding value to obtain an encoding value filled with the first character and an encoding value filled with the second character;
storing the encoding value filled with the first character into the encoding list;
determining whether a separator exists in the encoding value filled with the second character;
when yes, deleting the encoding value filled with the second character; and
when not, storing the encoding value filled with the second character into the encoding list.

4. The data compression method according to claim 1, wherein after obtaining the target lookup table for compression of the data to be compressed, the method further comprises:
storing the target lookup table in a memory.

5. A data decompression method, comprising:
reading data to be decompressed, and evenly dividing the data to be decompressed into at least two segments of bitstream data;
obtaining indexes contained in each segment of bitstream data and location information of each segment of bitstream data according to a separator of each segment of bitstream data;
obtaining a target lookup table from a data compression method comprising steps of:
establishing an initial lookup table by using data with a same numerical value in data to be compressed as one index and according to a number of indexes of the data compression method;
sequentially performing an encoding operation on the numerical value corresponding to each of the indexes of the data compression method to obtain an encoding result, and adding a separator to the encoding result to obtain an encoding list containing a target encoding value corresponding to each of the indexes of the data compression method and a target encoding length corresponding to each of the indexes of the data compression method; and
adding the encoding list to the initial lookup table to obtain the target lookup table for the data to be compressed after compression;
and
searching in parallel in the target lookup table obtained in the data compression method according to the indexes and the location information to obtain a decompression result of the data to be decompressed;
wherein the searching in parallel in the target lookup table obtained in the data compression method according to the indexes and the location information to obtain the decompression result of the data to be decompressed comprises:
sequentially searching in the target lookup table according to the indexes and the location information to obtain a decompression value corresponding to each index in each segment of bitstream data; and
using the decompression value corresponding to each index in each segment of bitstream data as the decompression result of the data to be decompressed.

6. The data decompression method according to claim 5, wherein after obtaining the decompression result of the data to be decompressed, the method further comprises:
reading next compress data after the data to be decompressed, and performing a decompression operation on the next data to be decompressed.

7. An electronic device, comprising: a processor, a communication interface, a memory, and a communication bus, wherein the processor, the communication interface, and the memory communicate with each other through the communication bus;
the memory is configured to store a computer program; and
the processor is configured to implement a data compression method by executing the program stored in the memory, the data compression method comprising:
establishing an initial lookup table by using data with a same numerical value in data to be compressed as one index and according to a number of indexes;
sequentially performing an encoding operation on the numerical value corresponding to each of the indexes to obtain an encoding result, and adding a separator to the encoding result to obtain an encoding list containing a target encoding value corresponding to each of the indexes and a target encoding length corresponding to each of the indexes; and
adding the encoding list to the initial lookup table to obtain a target lookup table for the data to be compressed;
wherein the establishing the initial lookup table by using the data with the same numerical value in the data to be compressed as one index and according to the number of indexes comprises:
collecting the data with the same numerical value in the data to be compressed, and using the data with the same numerical value as one index; and
counting a number of appearances of each of the same numerical values, and establishing the initial lookup table according to the same numerical values, the number of indexes, and the numbers of appearances of the same numerical values.

8. The electronic device according to claim 7, wherein sequentially performing the encoding operation on the numerical value corresponding to each of the indexes comprises:

step A1: sequentially performing an encoding operation on the numerical value corresponding to the index;

step A2: determining whether an encoding length of a current encoding number after the encoding operation is equal to a current maximum encoding length; if yes, performing step A3; if not, performing step A4;

step A3: obtaining a current encoding value of the current encoding number and performing an expanded encoding operation on the current encoding value, and performing step A2;

step A4: adding one to the current maximum encoding length, determining whether the current encoding number after the encoding operation is greater than a maximum serial number of the index; if yes, performing step A5; if not, performing step A1; and step A5: ending the encoding operation.

9. The electronic device according to claim 8, wherein obtaining the current encoding value of the current encoding number and performing the expanded encoding operation on the current encoding value comprises:

respectively filling a first character and a second character at a tail of the current encoding value to obtain an encoding value filled with the first character and an encoding value filled with the second character;

storing the encoding value filled with the first character into the encoding list;

determining whether a separator exists in the encoding value filled with the second character;

when yes, deleting the encoding value filled with the second character; and when not, storing the encoding value filled with the second character into the encoding list.

10. The electronic device according to claim 7, wherein after obtaining the target lookup table for compression of the data to be compressed, the method further comprises:

storing the target lookup table in a memory.

* * * * *